May 25, 1943.    G. F. BAHR    2,320,209
VEHICLE LAMP
Filed April 3, 1940

INVENTOR
Gustave F. Bahr
BY
ATTORNEYS

Patented May 25, 1943

2,320,209

UNITED STATES PATENT OFFICE 2,320,209

VEHICLE LAMP

Gustave F. Bahr, Bridgeport, Conn., assignor to Casco Products Corporation, Bridgeport, Conn., a corporation of Connecticut Application April 3, 1940, Serial No. 327,552

7 Claims. (Cl. 240—41.5)

This invention relates to a vehicle head lamp, and, more particularly, to one which may be quickly and rigidly secured to a vehicle.

The lamp of the present invention is shown in the preferred embodiment thereof as an auxiliary driving light adapted to be mounted to a support such as the usual bumper bar of the vehicle, but the invention is not necessarily limited to such a lamp.

One of the objects of my invention is to provide a construction wherein the reflector and lens are assembled together as a sealed unit. The reflector and lens, according to the present invention, once assembled, form a unit sealed against the entry of moisture and dirt. This construction prevents the tarnishment of the polished surface of the reflector and prolongs the life of the lamp.

To this end, the reflector and lens are each provided with an annular sealing surface about the rim edges thereof which are, when properly assembled, to engage the opposite faces of a suitable sealing gasket. A pair of rings disposed about the reflector and lens respectively are provided with means by which they may be drawn together to clamp the sealing surfaces of the reflector and lens against the opposite faces of the gasket.

The ring, disposed about the lens, is further provided with a surface to further seal the unit against moisture and dirt conforming to the shape of the face of the lens engaged thereby.

The so-assembled unit may be handled as such and mounted to a suitable casing in any desired manner. In the form of the invention herein disclosed, however, the unit, comprising the reflector and lens, is mounted to a casing by one of the rigs in such a manner that all means by which the unit is secured together are concealed. Thus, all unsightly securing means which might mar the appearance of the lamp are hidden from view.

A bracket arm having one end adjustably secured to the lamp carries a clamp at the opposite end by means of which the lamp may be adjustably secured to some suitable support such as the usual bumper bar of a vehicle. The clamp is provided with means for drawing the coacting parts of the device together to grip the support which also acts to securely mount the lower end of the bracket arm to the clamp.

Both the means securing the upper end of the bracket arm to the lamp and the means for drawing the coacting parts of the clamp cnstruction together are so formed that they cannot be adjusted except by the use of a special tool. It is, therefore, difficult for the lamp to be surreptitiously taken from the vehicle to which it is mounted, for the bracket and clamp due to the need of a special tool to remove the same, are substantially theftproof.

Other features and advantages will hereinafter appear.

Figure 1:
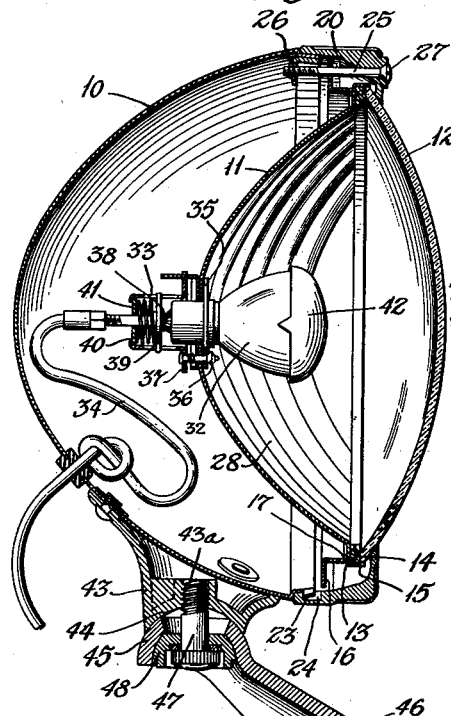
Figure 1 is a side sectional view of my head lamp.
Figure 2:
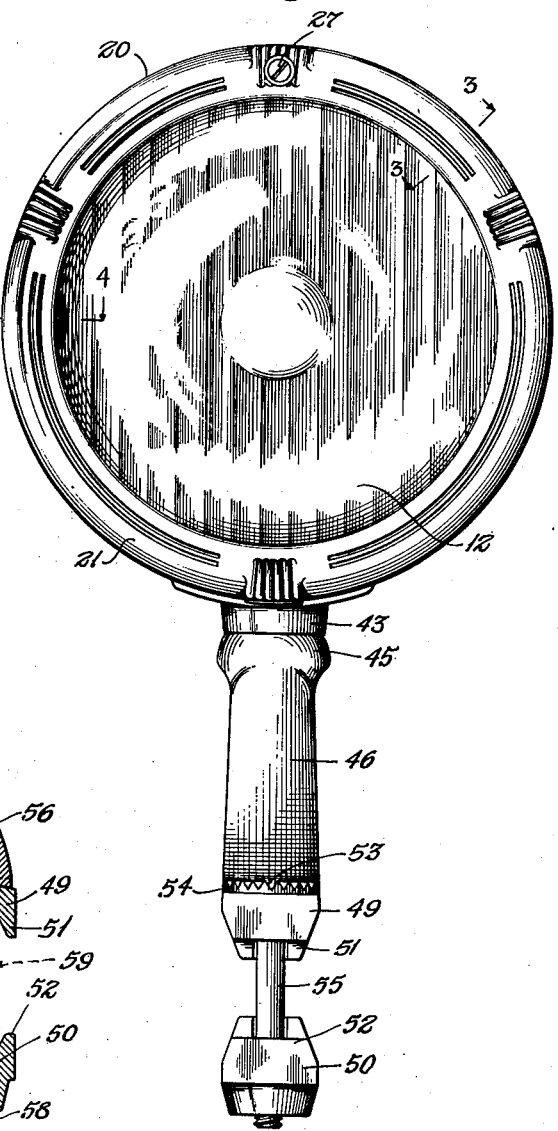
Fig. 2 is a front elevational view of the same.

Referring now to the embodiment of the invention illustrated in the accompanying drawing, the lamp comprises a casing 10 within which is disposed a reflector 11, having mounted therein the usual lamp bulb and a lens 12. The reflector 11 is provided with a flat annular seat 13 about its rim edge, which receives a suitable gasket 14.

The lens 12, herein shown of concavo-convex shape, is formed at its rim edge with an annular ground surface which is to engage the free face of the gasket 14. A peripheral wall 15 of the seat prevents lateral movement of the gasket and lens when assembled as shown in Fig. 1.

A ring 16, is disposed about the rear of the reflector at the rim edge thereof and is provided with a forwardly projecting portion terminating in an offset portion 17 which engages the rear surface of the seat 13. The ring 16 is formed with a plurality of apertures through which extend screws 18 having the threaded ends thereof received within tapped sockets 19 formed in the rear edge of an annular cap 20. The cap 20 is formed with an inwardly extending flange 21 terminating in a smooth lens-engaging surface 22 which lies against the outer face of the lens 12.

The screws 18, when threaded into the sockets 19, draw the ring 16 and cap 20 together so that the seat 13 is clamped against one face of the gasket and the lens between the opposite face of the gasket and the lens-engaging surface 22 of the cap 20.

It will be seen that once the screws 18 are tightened and the ring 16 and cap 20 drawn together, the jointure between the rim edges of the reflector and lens is sealed against the entry of moisture and dirt. It will also be noticed that the free edge of the peripheral wall of the seat extends over the joint between the gasket and the ground face of the lens so that the jointure between the reflector and lens is further sealed. The jointure between the rim edges of the reflector and lens is not only sealed, but, as the surface 22 is shaped to lie snugly against the convex outer face of the lens, this union is also sealed.

To mount the cap 20, carrying the lens and reflector to the casing 10, the cap is slipped over a substantially cylindrical surface of the casing to cause a resilient lug, 23, partially lanced from the cylindrical surface of the casing to be received within a groove 24 formed in the interior surface of cap 20.

To more securely hold the cap to the casing, the cap is provided with an aperture extending therethrough adapted to receive a suitable screw 25, the inwardly projecting end of which is threaded into a nut 26 suitably secured within the casing 10.

It will be seen that with the cap 20 carrying the reflector and lens mounted to the casing 10, as shown in Fig. 1, the ring 16 and screws 18 will be completely hidden from view and the only securing means visible to an observer is the head 27 of the screw 25.

The lamp, therefore, when the same is assembled, does not present a number of unsightly securing means and yet the reflector and lens are securely mounted within the casing and the lamp is sealed against the entry of dirt and moisture.

The reflector 11, as illustrated in the embodiment of the invention, shown in the accompanying drawing, is provided with a plurality of vertical flutes 28 to laterally spread the light rays reflected. This type of reflector is to be used where the lamp is provided with a tinted lens and the lamp used as a fog lamp. To insure that the reflector is properly mounted and the flutes thereof extend vertically when the reflector is assembled with the lens, a finger 29, struck from a peripheral wall of the seat 13, is adapted to be positioned within a slot 30 formed in a boss 31 provided on the interior surface of the cap 20. The reflector with the finger 29 disposed in the slot 30 will then be properly mounted with the flutes thereof extending vertically.

The electric lamp bulb 32 is releasably secured in an electrical connector 33 connected to a source of current by the conductor 34. The bulb may be releasably secured in the electrical connector 33 in any desired manner, but, as herein shown, the bulb carries a disk 35 provided with a plurality of keyhole slots adapted to receive the heads 36 of the spring urged pins carried by a flange 37 of the connector 33. The connector 33 is provided with a contact member 38, electrically connected to the conductor 34, adapted to engage the usual base contact of the bulb 32.

To insure a good electrical engagement, the contact 38 is carried by a disk 39, normally urged outwardly of the connector by a coil spring 40 seating on a disk of insulating material 41 closing the end of the connector 33.

The bulb 32 is replaceable by turning the same to rotate the disk 35 so that the heads 36 of the pins ride into the enlarged portion of the keyhole slots which permits the bulb to be removed from the connector.

The bulb, in the embodiment of the invention herein shown, is provided with a reflector cap 42 to prevent direct rays passing through the lens. The reflector cap, as will be understood, deflects all light rays back against the reflector whence they are then reflected forward.

To mount the lamp to a support, there is provided a bracket 43 fixed to the bottom of the casing by rivets or other suitable means. The bracket is formed with a socket 44 receiving a substantially ball-like member 45 carried by an extension arm 46.

To hold the ball-like member 45 in the socket 44, the socket is formed with a tapped aperture 43a to receive the threaded end of a screw 47, the head of which seats in a recess formed in a washer 48 carried within the ball-like member 45. The ball-and-socket connection, between the bracket 43 and the arm 46, may be adjusted by turning the screw 47 to clamp the convex surface of the ball member 45 tightly against the concave surface of the socket 44. This ball-and-socket connection permits a universal movement of the lamp about the arm 46, so that the same may be adjusted.

Figure 5:
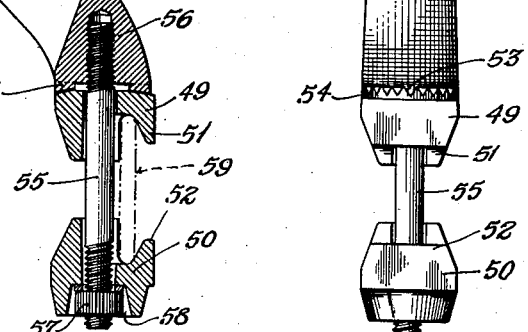
Fig. 5 is a perspective view of the special tool required to mount and dismount my lamp.
Figure 3:
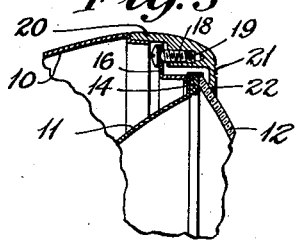
Fig. 3 is a sectional view taken along line 3—3 of Fig. 2.
Figure 4:
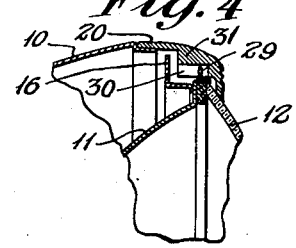
Fig. 4 is a view similar to Fig. 3 but taken along line 4—4 of Fig. 2.

It will be noticed that the head of the screw 47 seats in the recess formed in the washer 48 in such a manner that the same is not easily accessible. This construction prevents the screw 47 from being removed by dishonest persons if they should attempt to remove the lamp from the bracket arm 46. A purchaser of a lamp embodying my invention will be supplied with a special tool, such as shown in Fig. 5, which tool is so formed that it may operate upon the head of the screw 47.

To mount the lamp on a vehicle, the other end of the arm carries a clamping device which may be secured to some suitable support on the vehicle such as the usual bumper bar or the like.

The clamping device, as shown in the present embodiment of the invention, comprises an upper and lower member 49 and 50 respectively, each provided with hook-like portions 51 and 52 which may engage the upper and lower edges of the bumper bar respectively. The lower end of the arm 46 terminates in a serrated face 53 adapted to engage a similarly formed face 54 on the top surface of the upper clamp member 49. A pin 55, having its opposite ends threaded, slidably projects through suitable apertures formed in the upper and lower clamp members and the upper projecting end is threadedly received within a tapped socket 56 formed in the serrated face 53 of the arm 46. The opposite end takes a nut 57 received within a recess 58 formed in the lower face of the bottom clamp member 50.

To mount the clamp to a support such as the bumper bar 59, the one end of the pin 55 is threaded into the socket 56 whereupon the upper member 49 is disposed about the pin and moved upwardly thereof until the face 54 engages the face 53 of the arm 46. The member 49 is then disposed over the upper edge of the bumper bar 59 with the pin lying to the rear of the bar. The member 50 is now slipped over the lower end of the pin 55 with the hook portion 52 thereof disposed over the lower marginal face of the bar 59. The nut 57 may now be threaded onto the lower end of the pin 55. The nut is disposed, when threaded onto the pin 55, in the recess 58 but by means of the special tool, shown in Fig. 5, the nut may be tightly threaded on the end of the pin to cause the face 54 of the member 49 to be clamped against the face 53 of the arm 46. The upper clamp member 49 will be in turn tightly clamped against the upper edge of the bumper bar 59 as the lower clamp member 50 is urged against the lower edge of the bumper bar.

It will be seen that the single operation performed on the nut 57 securely clamps not only the arm 46 to the clamping device, but also securely mounts the clamp members 49 and 50 to the bumper bar 59.

In use it will be seen that the lamp presents a pleasing appearance as all unsightly securing means are concealed from view and as the reflector and lens are sealed as a unit the lamp will give long and efficient service.

My special bracket and clamp as they can not be surreptitiously removed renders the lamp substantially theftproof permitting the lamp to be mounted on the exterior of the vehicle without fear of some dishonest person removing it from its support.

Variations and modifications may be made within the scope of the invention and portions of the improvements may be used without others.

I claim:

1. In a lamp of the type described, a reflector having a flat annular rim forming a gasket-receiving seat; a gasket disposed on said seat; a lens provided with a flat surface at the rim edge thereof engaging the exposed face of said gasket; a flange formed about the periphery of said seat and extending normally therefrom a distance sufficient to cover the jointure between the seat and one face of the gasket and the other face of the gasket and lens; an annular cap surrounding the lens at the rim edge thereof and having an inwardly extending annular flange formed with a surface shaped to snugly engage the outer face of said lens; a ring disposed about said reflector and in engagement with the rear side of said flat rim; and means for securing the ring to said cap whereby the gasket is clamped between the seat of the reflector and the flat surface of the lens and the lens between the gasket and the lens-engaging surface of the annular flange of said cap for the full periphery thereof to form a completely sealed unit.

2. In a lamp of the type described, a reflector formed with a flat annular surface at the rim edge thereof; a gasket seated on said surface; a lens having a sealing surface engaging the exposed face of said gasket; a ring disposed about the rim edge of said reflector having a portion in annular engagement with the rear side of said flat surface; an annular cap disposed about said lens and provided with an annular surface snugly engaging the outer face of said lens; a flange formed about the periphery of said flat annular surface of said reflector and extending normally therefrom; means for securing said ring and cap together to apply pressure to the elements therebetween at all points therearound whereby said gasket is clamped between the flat annular surface of the reflector and the sealing surface of the lens to thereby seal the exterior of said reflector and lens against entry of moisture and dirt, the flange extending from the annular surface of the reflector a distance sufficient to cover the lines of jointure between the said annular surface and one face of the gasket and the opposite face of the gasket and sealing surface of said lens to augment the seal; a casing; and means for mounting the reflector and lens within the casing.

3. In a lamp of the type described, a casing having means for attachment to a support; a reflector within said casing; an annular seat formed about the rim edge of said reflector; a flange formed about the periphery of said seat and extending normal thereto; a gasket disposed on said seat and having its peripheral edge thereof engaging the inner wall of said flange; a lens provided with a rim portion engaging the exposed face of said gasket, the lens having a diameter equal to the inner diameter of said flange; a cap surrounding said lens and having a lens-engaging surface shaped to snugly engage the outer face of said lens; means within the casing and having annular engagement with said rim portion for drawing said cap toward the lens to cause said lens-engaging surface thereof to snugly engage the outer surface of the lens to hold the rim portion thereof tightly against the said exposed face of the gasket and hold the gasket tightly seated on the seat of said reflector at all points therearound, the flange sealing the junctions between the seat, gasket and lens; and means for securing the cap to the casing.

4. In a lamp of the type described, a casing; a reflector formed with a flat annular surface at the rim edge thereof; a gasket seated on said surface; a lens having a sealing surface engaging the exposed face of said gasket; a ring disposed about the rim edge of said reflector and having a portion in annular engagement with the rear side of said flat surface; an annular cap disposed about said lens provided with an inwardly extending annular surface snugly engaging the outer face of said lens at a distance spaced inwardly of the rim edge thereof; means for securing said ring and cap together whereby said gasket is clamped at all points between the flat annular surface of the reflector and the sealing surface of the lens to seal the interior of said reflector and lens against entry of moisture and dirt; means carried by said reflector for covering the rim edge portions of said reflector, gasket and lens to further seal said reflector and lens; and means for securing the cap to said casing with the reflector disposed therein, said cap concealing from view said ring and means for securing the same to said cap.

5. In a lamp of the type described, a casing; a reflector formed with a plurality of parallel arranged flutes; a source of light carried by said reflector; a seat formed about the rim edges of said reflector; a gasket disposed on said seat; a lens provided with a rim edge portion engaging the exposed face of said gasket; a cap circumscribing said lens and having an inwardly extending annular lens-engaging surface; a ring disposed to the rear of said reflector and having a forwardly extending annular portion engaging the rear side of said seat; means for securing the ring and cap together to tightly clamp the gasket between the seat of the reflector and the rim edge of the lens at all points about the periphery thereof; a projection carried by said reflector locked within a recess formed in said cap when the ring and cap are secured together, the disposition and locking of said projection within said recess insuring the assembly and retaining of said reflector in a predetermined position relative to said cap; and means for securing said cap to said casing with the flutes of said reflector extending vertically thereof whereby light reflected by said reflector will be horizontally deflected by said flutes.

6. In a lamp of the type described, a reflector having formed at its rim edge a flat annular surface; a flange formed about the periphery of said surface and extending normal thereto; a gasket seating on said surface and held against movement by said flange; a lens provided with a flat annular sealing surface at the rim edge thereof, said sealing surface engaging the exposed face of said gasket, the marginal portions of said sealing surface tightly engaging the inner surface of said flange, the flange extending forwardly of the flat annular surface of the reflector a distance sufficient to cover the lines of jointure between the flat surface of the reflector and one face of the gasket and the opposite face of the gasket and sealing surface of the lens; an annular cap surrounding the lens at the rim edge thereof; a ring disposed about the rim edge of said reflector and in annular engagement therewith; and means for securing the ring to said cap for clamping the reflector and lens between said ring and cap for the entire periphery thereof with the gasket interposed between the rim edges thereof.

7. In a lamp of the type described, a reflector having formed at its rim edge a flat annular surface; a flange formed about the periphery of said surface and extending normal thereto; a gasket seating on said surface and held against movement by said flange; a lens provided with a flat annular sealing surface at the rim edge thereof, said sealing surface engaging the exposed face of said gasket, the marginal portions of said sealing surface tightly engaging the inner surface of said flange, the flange extending forwardly of the flat annular surface of the reflector a distance sufficient to cover the lines of jointure between the flat surface of the reflector and one face of the gasket and the opposite face of the gasket and sealing surface of the lens; an annular cap surrounding the lens at the rim edge thereof and having an inwardly extending annular flange formed with a surface shaped to snugly engage the outer face of the lens; a ring disposed about the rim edge of said reflector and having a portion thereof annularly engaging the rear side of the flat surface of said reflector; and means for securing the ring to said cap for clamping the reflector and lens between said ring and cap around the entire periphery with the gasket interposed between the rim edges thereof and the outer face of the lens snugly engaged by the lens-engaging surface of the cap.

GUSTAVE F. BAHR.